United States Patent [19]

Wassen et al.

[11] 4,038,550
[45] July 26, 1977

[54] METHOD AND AN APPARATUS FOR THE MEASURING OF THE WALL THICKNESS OF A TUBE

[75] Inventors: Johann Wassen, Brackwede; Gunter Schulz, Dusseldorf; Gunter Ivens, Julich, all of Germany

[73] Assignee: Mannesmannrohren-Werke AG, Dusseldorf, Germany

[21] Appl. No.: 591,532

[22] Filed: June 30, 1975

[30] Foreign Application Priority Data

Aug. 20, 1974 Germany .............................. 2440274

[51] Int. Cl.² .......................................... G01N 23/00
[52] U.S. Cl. .............................. 250/358 P; 250/360
[58] Field of Search ...................... 250/358 P, 358, 360

[56] References Cited
U.S. PATENT DOCUMENTS

| | | | |
|---|---|---|---|
| 2,583,132 | 1/1952 | Altar et al. | 250/358 |
| 2,702,864 | 2/1955 | McKee | 250/360 |
| 2,965,758 | 12/1960 | Malick | 250/358 P |
| 3,178,576 | 4/1965 | Arvanetakis | 250/358 P |
| 3,835,324 | 9/1974 | Weigle | 250/360 |

*Primary Examiner*—Harold A. Dixon
*Attorney, Agent, or Firm*—Cullen, Settle, Sloman & Cantor

[57] ABSTRACT

The method of automatically measuring tube wall thickness includes axially introducing an radio-active radiation source into the tube to be measured and directing its radiation at about 45 degrees toward the tube wall. Other steps include distributing a plurality of scintillation counters uniformly around the tube, and measuring the transmitted radiation by said counters. The measurement values compensated for a specific wall thickness being amplified proportionally to the radiation intensity and are each adapted to be fed in a predetermined measuring time through a measuring capacitor, the charge values of the capacitors being indicated in succession and fed to a statistical measurement value detecting arrangement. Included is the preliminary step of automatically calibrating the measuring arrangement by axially introducing said radiation source into a corresponding tube with standard dimension, and measuring the radiation therethrough; and apparatus therefore.

2 Claims, 3 Drawing Figures

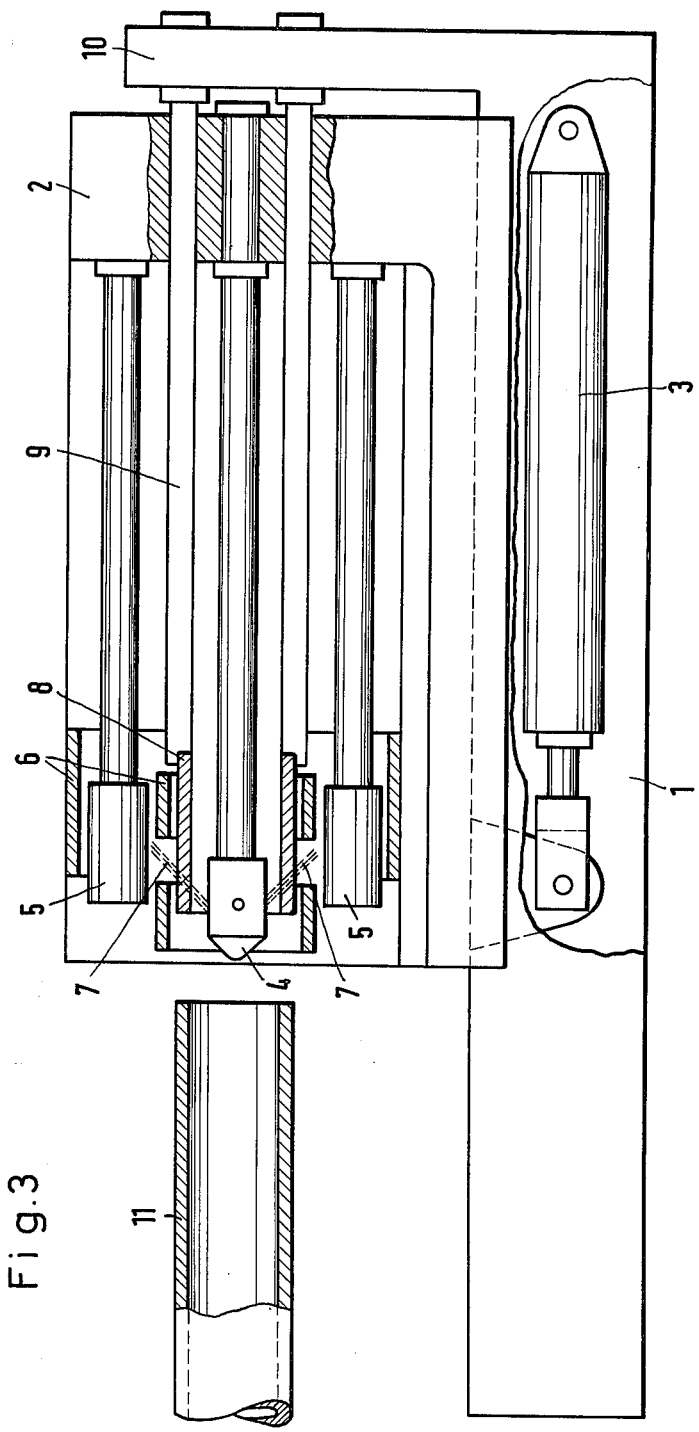

METHOD AND AN APPARATUS FOR THE MEASURING OF THE WALL THICKNESS OF A TUBE

The invention relates to an automatic tube wall thickness measuring method using a radioactive radiation source, and an apparatus for carrying out this method.

It is already known to carry out thickness measurements by means of radioactive radiation sources. In the case of hitherto known methods it was difficult and disadvantageous that owing to inadequate calibration possibilities it was not possible to obtain the necessary precision for wall thickness measurements.

The invention has as its object to provide a method with which the desired normal wall thickness of tubes can be measured in a stable manner over a relatively long time, and an apparatus for carrying out this method which carries out a necessary automatic adjustment by automatic comparison measurement.

To achieve this object, according to the invention a method is proposed for automatically measuring the wall thickness of tubes, which is characterised in that the radioactive radiation source is introduced centrally into the tube and its radiation, directed at about 45° towards the tube wall, is measured with a plurality of scintillation counters distributed in a uniform manner about the tube periphery, that the measurement values, compensated for a specific wall thickness, are amplified proportionally to the radiation intensity and are fed in a predetermined measuring time in each case to a measuring capacitor, and that the charge values of the capacitors are indicated in succession and are passed to a statistical measurement value detecting arrangement, and before each wall thickness measuring operation there is an automatic calibration of the measuring arrangement by means of a standard of comparison.

To carry out the method, according to the invention there is proposed an apparatus characterised by a radiation source which is adapted to be introduced centrally into the tube to be tested and which is arranged by means of a holding bar on a carriage adapted to be displaced in a longitudinal direction on a bed, and is situated coaxially within two cylindrical radiation protection elements which accompany the longitudinal movement of the radiation source, between which elements there are arranged in the manner of a turret head arrangement a plurality of scintillation counters, the internal radiation protection element comprising window-like apertures through which the radiation of the radiation source passes after passing through the wall of the tube/test piece or, in the retracted state of the carriage, after passing through the wall of a tube section which is used as a comparison standard, the latter being arranged with holding bars in a stationary manner on the bed, and per se known apparatus are also provided for indicating and detecting the values received by means of the scintillation counters.

The method according to the invention advantageously achieves the result that the otherwise relatively slow measuring method using radiation sources has now given way to simultaneous measuring at several measuring points and evaluation of measurement values in rapid succession which considerably accelerates the measuring operation at each measuring point, and the regular monitoring of the desired value with a calibration tube ensures that the following measurement has the desired accuracy.

A constructional form of the apparatus according to the invention is shown in the accompanying diagrammatic drawings:

FIG. 3 shows a side view partly in section of the apparatus in the calibration position.

Figure 1:
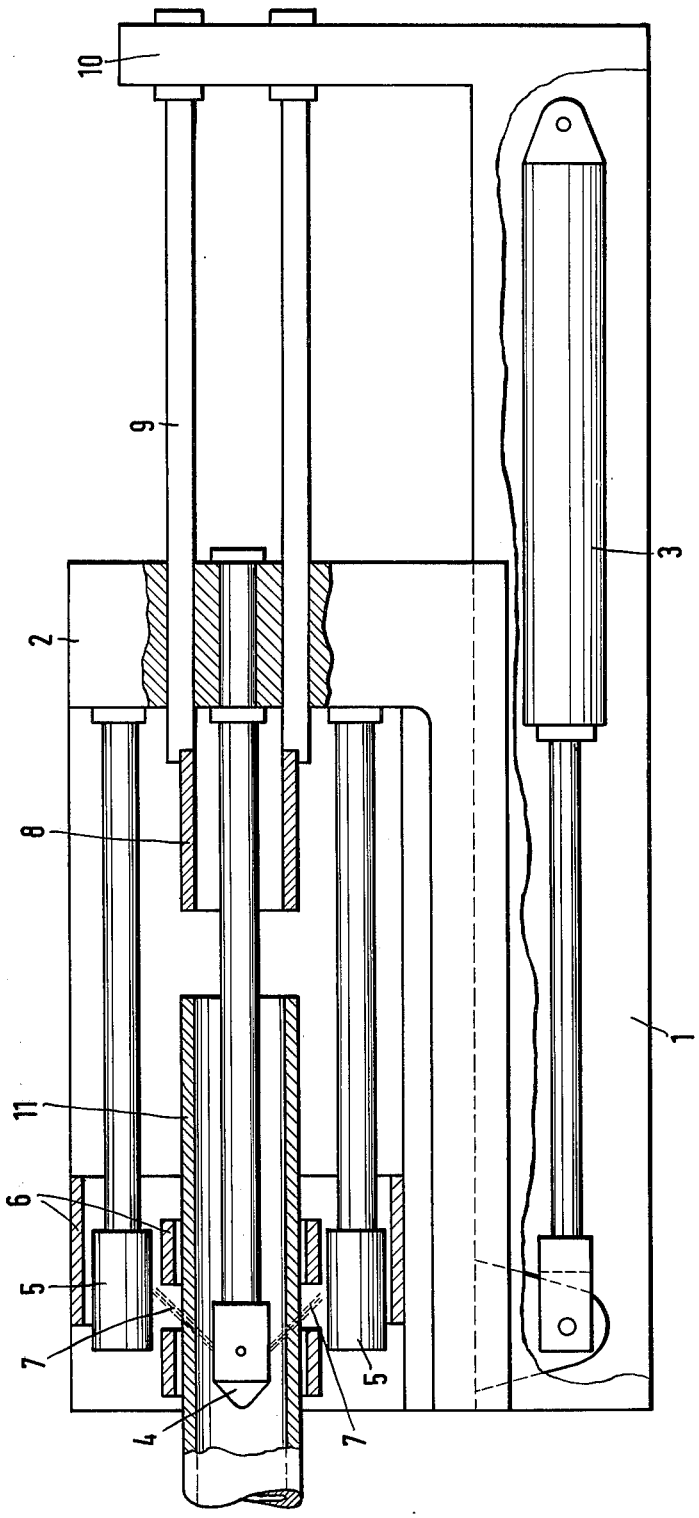
FIG. 1 shows a side view, partly in section, of the apparatus situated in the testing position.
Figure 2:
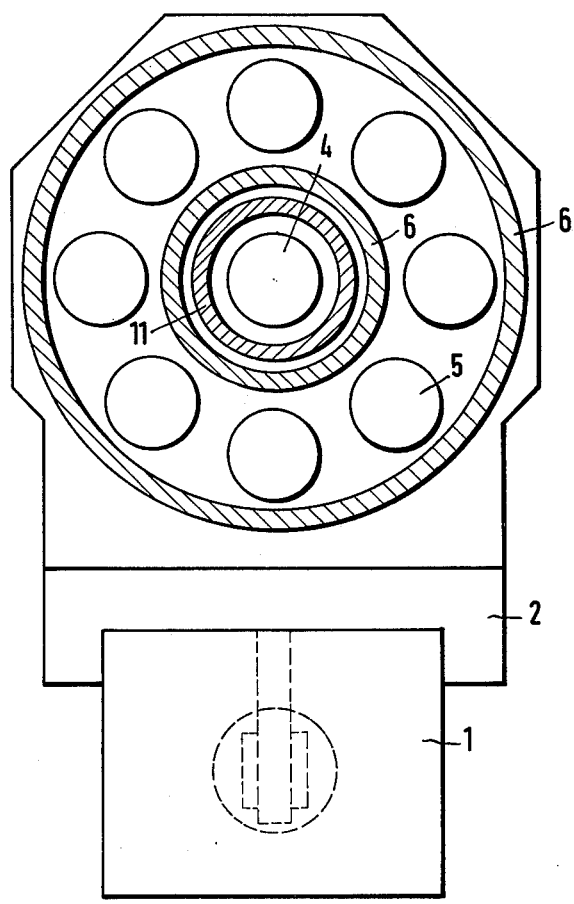
FIG. 2 shows a front view.

In FIG. 1, the bed 1 is provided with a mobile carriage 2 which is moved to and fro by a drive 3. Securely connected to the carriage 2 is a radiation source 4 which is arranged to project axially into the tube the wall thickness of which is being measured. Also securely connected to the carriage 2, and arranged about the radiation source 4 are co-axial tubular inner and outer radiation protection elements 6, the inner element 6 being provided with apertures 7. The radiation source 4 is surrounded by a plurality of equiangularly arranged scintillation counters 5 arranged between the two elements 6 (see FIG. 2). In the withdrawn position (FIG. 3) the radiation source 4 is surrounded by a replaceable calibration tube 8 of the required wall thickness which is held by bars 9 secured to the rear wall 10 of the bed 1, whereby the calibration tube 8 is held fast in position.

In a measuring operation there is sufficient forward movement to bring the carriage 2 with the scintillation counters 5 over the tube 11 and with the radiation source 4 centrally inside the tube 11. The radiation issuing through the apertures 7 at about 45° is measured at the same time by the scintillation counters 5 arranged around the tube 11, and passed on in such a manner to known devices such as for example measuring capacitors, thermionic voltmeters, etc, that optical indication and recording can be carried out.

Directly after the measuring operation the carriage 2 is withdrawn with the radiation source 4 and the scintillation counters 5 into the initial position (FIG. 3), where automatic comparison measurement is carried out with automatic adjustment through the agency of the calibration tube 8 of standard dimensions.

What we claim is:

1. Apparatus for measuring the wall thickness of a tube comprising:
    a bed adapted to mount said tube;
    a reciprocal carriage mounted on said bed for movements longitudinally of the tube axis;
    reciprocal means on said bed connected to said carriage;
    said carriage having an advanced testing position and a retracted position;
    a stationary calibration tube of predetermined wall thickness axially aligned with the tube to be tested, and mounted on and overlying said bed;
    a holding bar coaxial of and within said tubes anchored to said carriage and at one end mounting a radiation source;
    said source in the retracted position of said carriage being nested within said calibration tube, and in the testing position of said carriage, nested within the tube whose wall thickness is to be measured;
    a pair of concentric inner and outer tubular radiation protection sleeves mounted on said carriage enclosing the radiation element and adapted to alternately receive and enclose the corresponding portion of the tube to be tested when the carriage is in testing position and to receive and enclose the corresponding portion of the calibration tube when the carriage is retracted;

and a plurality of parallel equiangularly arranged scintillation counters parallel to said rod secured to said carriage and positioned around said radiation element, and disposed between said protection sleeves;

the inner protection sleeve having a series of window-like apertures through which radiation from the radiation source passes in the testing position of the carriage after passing through the wall of the tube to be tested and respectively, in the retracted position of the carriage after passing through the wall of the calibration tube;

said scintillating counters adapted for connection to apparatus including means for indicating and detecting values received from said scintillation counters.

2. In the apparatus for measuring wall thickness of a tube, as defined in claim 1, said radiation source being so formed as to direct its rays at an angle of about 45 % approximately to the tube walls.

* * * * *